(12) United States Patent
Hashimoto (10) Patent No.: US 7,817,314 B2
(45) Date of Patent: Oct. 19, 2010

(54) IMAGE READING APPARATUS AND MULTIFUNCTION APPARATUS INCLUDING THE SAME

(75) Inventor: Yohei Hashimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 853 days.

(21) Appl. No.: 11/589,713

(22) Filed: Oct. 31, 2006

(65) Prior Publication Data

US 2007/0097459 A1 May 3, 2007

(30) Foreign Application Priority Data

Oct. 31, 2005 (JP) .............................. 2005-316724

(51) Int. Cl.
*H04N 1/04* (2006.01)
(52) U.S. Cl. .................... 358/498; 358/474; 358/496; 358/296
(58) Field of Classification Search ................ 358/498, 358/474, 296, 496, 497
See application file for complete search history.

(56) References Cited

U.S. PATENT DOCUMENTS

| | | | |
|---|---|---|---|
| 5,839,044 A | 11/1998 | Taruki | |
| 5,862,446 A | 1/1999 | Hashizume et al. | |
| 6,057,936 A | 5/2000 | Obara et al. | |
| 6,128,100 A | 10/2000 | Uemura et al. | |

FOREIGN PATENT DOCUMENTS

| | | | |
|---|---|---|---|
| JP | 55-155249 | | 11/1980 |
| JP | 60-097344 | | 5/1985 |
| JP | 61-196244 | | 12/1986 |
| JP | 62-027755 | | 2/1987 |
| JP | 4-165365 | * | 6/1992 |
| JP | 06-052269 U | | 7/1994 |
| JP | 6-266176 | | 9/1994 |
| JP | 8-328334 | | 12/1996 |
| JP | 9-034183 | | 2/1997 |
| JP | 9-311514 | | 12/1997 |
| JP | 10-123804 | | 5/1998 |
| JP | 10-142875 | | 5/1998 |
| JP | 10-301349 | | 11/1998 |
| JP | 2000-284559 | | 10/2000 |
| JP | 2001-222202 | | 8/2001 |
| JP | 2003-066668 A | | 2/2003 |

OTHER PUBLICATIONS

JP Office Action dtd Apr. 20, 2010, JP Appln. 2005-316724, partial English Translation.

\* cited by examiner

*Primary Examiner*—Houshang Safaipour
(74) *Attorney, Agent, or Firm*—Banner & Witcoff, Ltd.

(57) ABSTRACT

An image reading apparatus includes a document mounting table, a document cover disposed above the document mounting table and provided to be displaceable between a position in which the mounted document is covered and a position in which the document mounting table is opened, an automatic document feeder delivering and discharging the document to an upper surface of the document cover, a reading unit that reads an image on a surface of the mounted document or an image on a surface of the document delivered by the automatic document feeder; and a panel disposed on the document cover. The panel includes an installation surface provided with a display portion or an operating portion. The panel also includes a regulating surface which is protruded from the upper surface and which regulates a position of an end of the document discharged through the automatic document feeder.

7 Claims, 8 Drawing Sheets

IMAGE READING APPARATUS AND MULTIFUNCTION APPARATUS INCLUDING THE SAME

CROSS-REFERENCE TO THE RELATED APPLICATION(S)

This application is based upon and claims priority from prior Japanese Patent Application No. 2005-316724 filed on Oct. 31, 2005, the entire contents of which are incorporated herein by reference.

TECHNICAL FIELD

The present invention relates to an image reading apparatus and a multifunction apparatus including the image reading apparatus, and more particularly to a technique for suppressing a deterioration in a visibility and an operability of a panel.

BACKGROUND

Conventionally, some image reading apparatuses or multifunction apparatuses including the image reading apparatus include a so-called flat bed. In general, the flat bed is provided with a document cover for covering a document mounted on a document mounting table, In some cases, an upper surface of the document cover is provided with a panel including a display portion for displaying predetermined information or an operating portion for a user to carry out an operation in order for the user to operate the flat bed, as disclosed in JP-A-6-266176.

According to such a structure, it is not necessary to provide the panel to be protruded from a side surface of the document mounting table. Therefore, it is possible to reduce a space required for installing the image reading apparatus or the multifunction apparatus including the image reading apparatus.

In such an image reading apparatus, an automatic document feeder (hereinafter referred to as an "ADF") is provided in order to read a plurality of documents.

The ADF usually includes a document tray is disposed above the document cover, capable of stacking documents and is disposed in such a manner that a document delivered from the document tray is discharged to an upper surface of the document cover.

When the ADF is thus disposed and the panel is further provided on the upper surface of the document cover, however, there is a possibility that the document discharged to the upper surface of the document cover by the ADF may obstruct the panel, resulting in a deterioration of visibility and operability of the panel, forcing an inconvenience upon a user.

SUMMARY

According to an aspect of the invention, there is provided an image reading apparatus including: a document mounting table on which at least one document is to be mounted; a document cover disposed above the document mounting table and provided to be displaceable between a position in which the document mounting table is covered and a position in which the document mounting table is not covered; an automatic document feeder including a document tray being disposed above the document cover capable of mounting at least one document, the automatic document feeder delivering the document mounted on the document tray and discharging the document to an upper surface of the document cover; a reading unit that reads an image on a surface of the document mounted on the document mounting table or an image located on a surface of the document delivered by the automatic document feeder; and a panel disposed on the document cover, the panel including an arrangement surface provided with a display portion that displays predetermined information or with an operating portion which can be operated by a user, wherein the panel includes a regulating surface which is different from the arrangement surface, the regulating surface being protruded from the upper surface of the document cover and which regulates a position of an end of the document discharged through the automatic document feeder.

BRIEF DESCRIPTION OF THE DRAWINGS

These and other aspects of the present invention will be made more fully apparent from the following detailed description taken in conjunction with the accompanying drawings, in which.

DETAILED DESCRIPTION

An aspect according to the invention will be described below with reference to the drawings.

Figure 1:
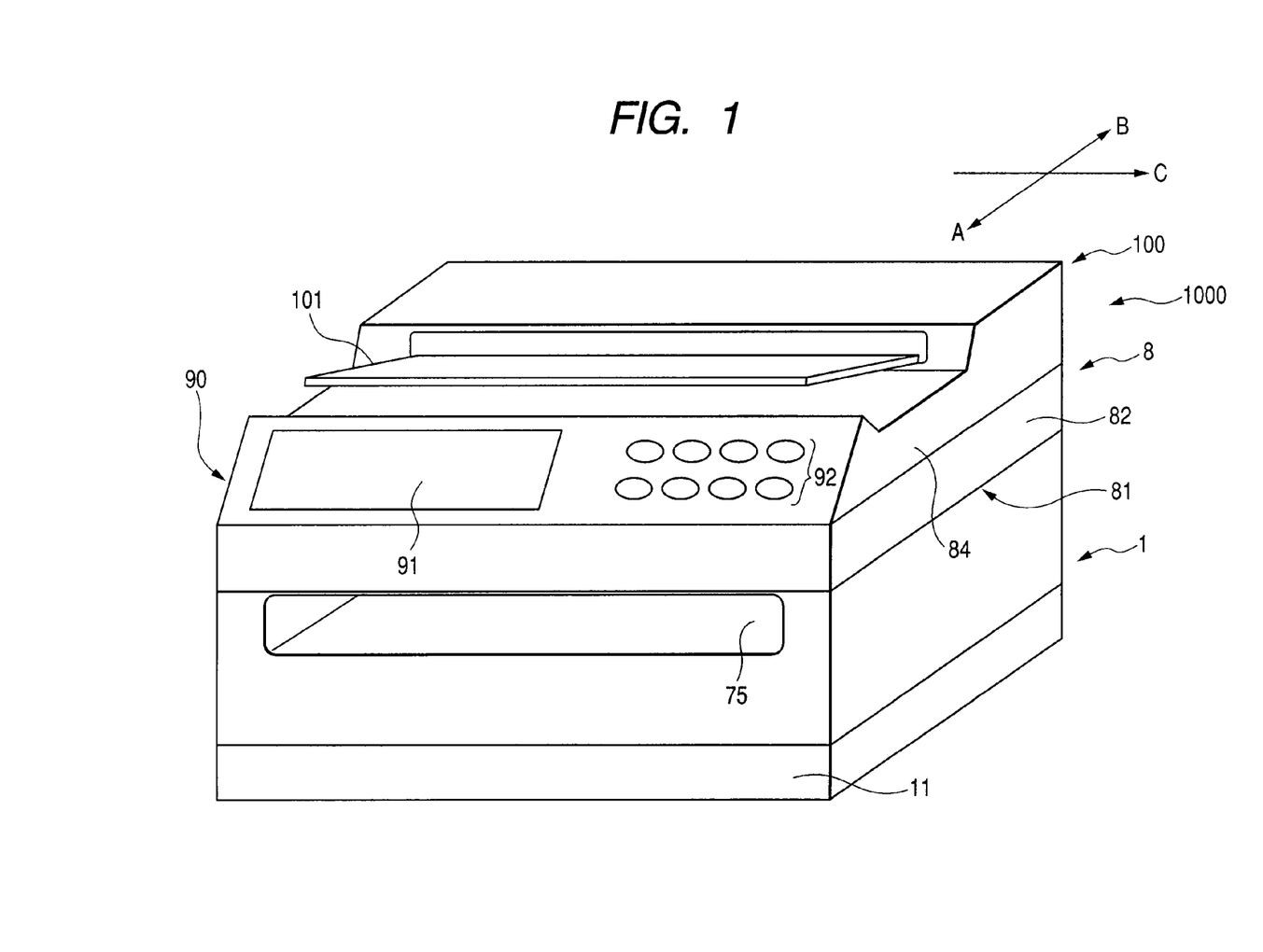
FIG. 1 is a perspective view showing a multifunction apparatus according to an aspect of the invention.
Figure 2:
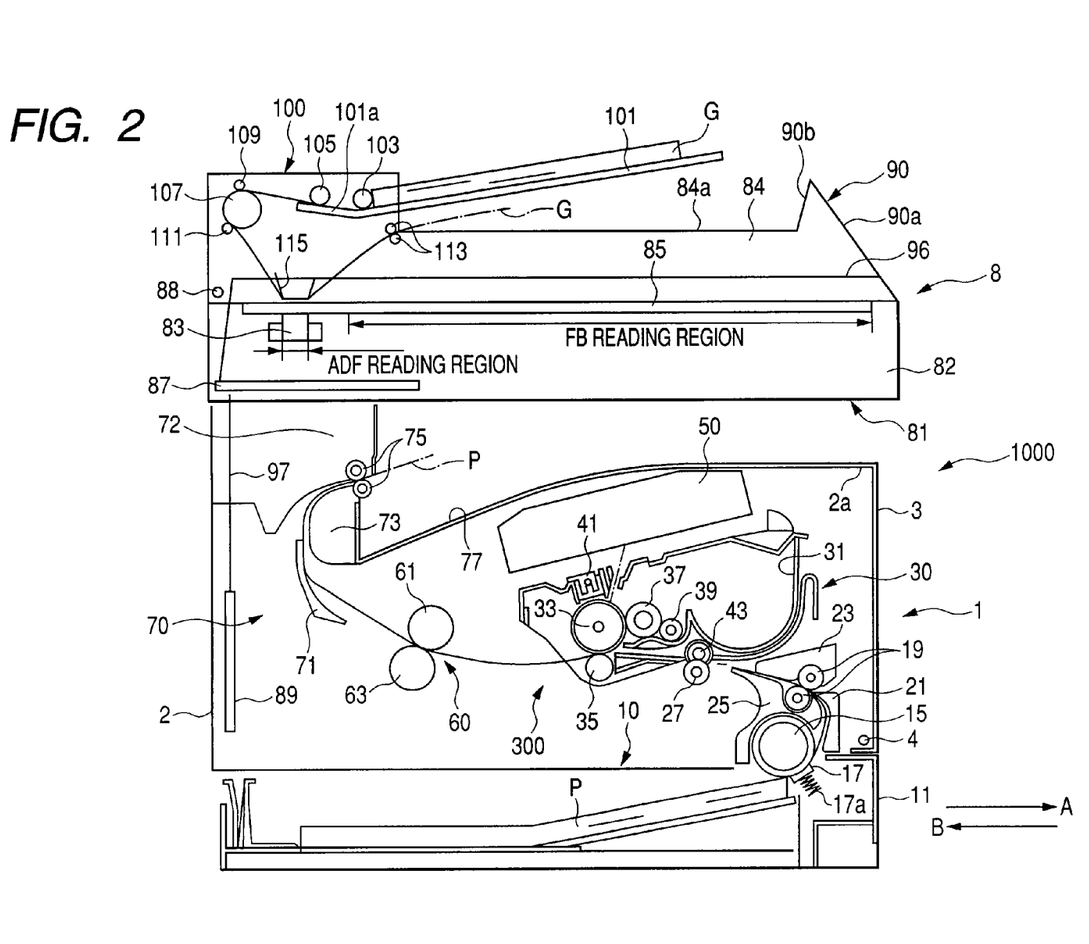
FIG. 2 is a central sectional view showing the multifunction apparatus.

FIG. 1 is a perspective view showing a multifunction apparatus 1000 according to a first aspect of the invention. FIG. 2 is a central sectional view showing the multifunction apparatus 1000 according to the first aspect.

The multifunction apparatus 1000 includes a printer 1 as an image forming apparatus and a scanner 8 as an image reading apparatus, as shown in FIGS. 1 and 2.

The printer 1 is disposed in a lower side of the multifunction apparatus 1000 and forms a predetermined image on a surface of a recording paper P used as a recording medium.

The scanner 8 is disposed above the printer 1 and reads an image located on a surface of a document G.

For example, data on the image read by the scanner 8 are transferred to the printer 1, and the printer 1 can form an image on the surface of the recording paper P based on the data.

Figure 3:
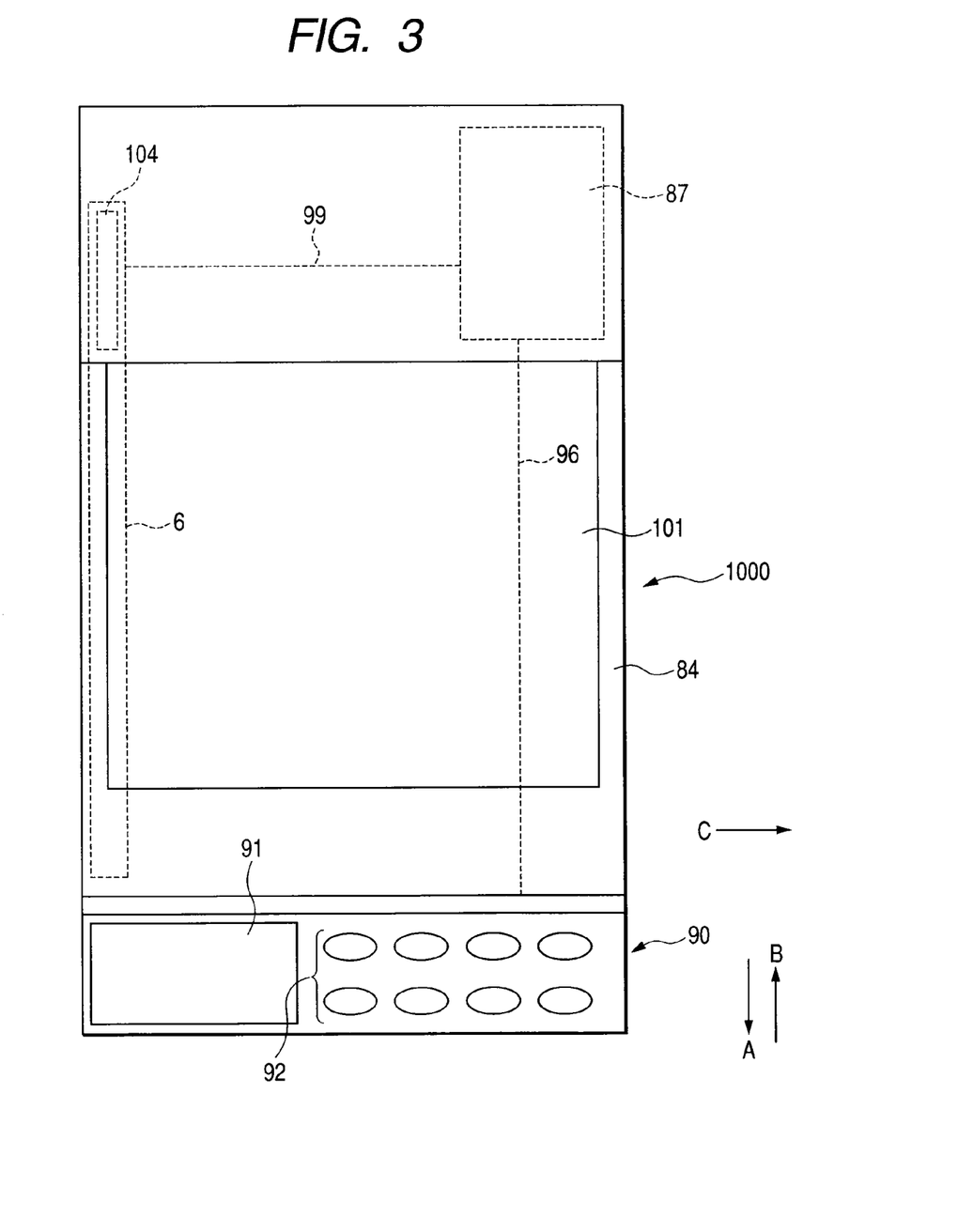
FIG. 3 is a plan view showing the multifunction apparatus seen from above.

As shown in FIG. 2, the printer 1 includes a housing 2, a paper feeding unit 10, an image forming unit 300 which forms an image forming portion, a paper discharging unit 70 which forms a discharging unit, a main control board 89, and a driving unit 6 (see FIG. 3).

The housing 2 covers an inner part of the printer 1.

The paper feeding unit 10 is provided in a lower side of the printer 1 and delivers the recording paper P to the image forming unit 300.

The image forming unit 300 is provided on a downstream side of the paper feeding unit 10 in a direction of delivery of the recording paper P from the paper feeding unit 10 and forms an image on the recording paper P delivered by the paper feeding unit 10.

The paper discharging unit 70 is provided on the downstream side of the image forming unit 300 in the direction of delivery of the recording paper P from the image forming unit 300 and discharges the recording paper P, which includes the image formed by the image forming unit 300, to an outside of the printer 1.

The main control board 89 controls the whole multifunction apparatus 1000 upon receipt of a predetermined signal and image data from an external computer and the scanner 8.

FIG. 3 is a plan view showing the multifunction apparatus 1000 as seen from above.

As seen in FIG. 3, the driving unit 6 includes a motor and a gear which are not shown, and is controlled by the main control board 89 and drives the image forming unit 300, the paper feeding unit 10 and the paper discharging unit 70.

The housing 2 includes an opening portion 2a formed on a side in a direction of an arrow A in the drawing (hereinafter referred to as an "A" direction), and furthermore, a cover 3 for covering the opening portion 2a is attached to the housing 2. The cover 3 includes a rotating shaft 4 on a lower end thereof, and the rotating shaft 4 is rotatably supported in the housing 2. By such a structure, the cover 3 can move an upper end thereof in the A direction, thereby opening the opening portion 2a.

The paper feeding unit 10 includes a paper feeding cassette 11, a separating roller 15, a delivery roller 19, a guide 21, a guide 23, a guide 25, and a resist roller 27.

The paper feeding cassette 11 is provided to be freely pulled out from the printer 1 in the A direction, and takes a shape of a box having an opened upper part. Moreover, the paper feeding cassette 11 includes a separating pad 17 which is disposed opposite to the separating roller 15 and is energized toward the separating roller 15 by means of a spring 17a.

The separating roller 15 is provided above one end side of the paper feeding cassette 11 and separates the recording papers P one by one together by means of working in conjunction with the separating pad 17, and at the same time, feeds the recording papers P toward the guides 21 and 25.

The guides 21 and 25 are provided above the separating roller 15 and guide the recording paper P fed from the separating roller 15 to the delivery roller 19.

The delivery roller 19 is constituted by a pair of rollers and delivers the recording paper P guided by the guides 21 and 25 toward the resist roller 27.

The guide 23 is provided above the delivery roller 19, and together with the guide 25, guides the recording paper P delivered from the delivery roller 19 to the resist roller 27.

The resist roller 27 is provided on a downstream side of the guides 23 and 25 in the direction of delivery of the recording paper P from the guides 23 and 25, and a tip of the recording paper P guided by the guides 23 and 25 is interposed between the resist roller 27 and the resist roller 43 which stop the recording paper P and then feed the recording paper P toward a transfer position according to predetermined timing.

The image forming unit 300 includes a process cartridge 30 for transferring an image onto the recording paper P delivered by the paper feeding unit 10, an exposing unit 50, and a fixing unit 60 for fixing the image transferred by the process cartridge 30 onto the recording paper P.

The exposing unit 50 includes a laser diode and a polygon mirror (which are not shown), and predetermined image data are transmitted from the main control board 89 to the exposing unit 50. The exposing unit 50 irradiates a laser beam toward a photosensitive drum 33 based on the image data, thereby exposing a surface of the photosensitive drum 33.

The process cartridge 30 is disposed above the paper feeding unit 10 and is provided to be freely pulled out in the A direction when the cover 3 is rotated outward so that the opening portion 2a is opened.

The process cartridge 30 includes a developer housing chamber 31, a supply roller 39, a developing roller 37, the photosensitive drum 33, a transfer roller 35, a charger 41, and the resist roller 43.

A toner is accommodated as a developer in the developer housing chamber 31. The toner accommodated in the developer housing chamber 31 is stirred by a stirring member (which is not shown), and at the same time, is fed to the supply roller 39.

The supply roller 39 is provided adjacent to the developer housing chamber 31 and further supplies the toner fed from the developer housing chamber 31 to the developing roller 37.

The developing roller 37 is disposed to come into close contact with the supply roller 39 and a developing bias is applied thereto by a bias applying unit which is not shown. The developing roller 37 carries the toner supplied by the supply roller 39 and charges the toner to be positive.

The charger 41 is of a scorotron type, and is disposed opposite to the photosensitive drum 33 and charges the surface of the photosensitive drum 33 to be positive.

The photosensitive drum 33 is provided adjacent to the developing roller 37. The surface of the photosensitive drum 33 is uniformly charged to be positive by the charger 41. Then, the surface of the photosensitive drum 33 is exposed by the exposing unit 50 so that an electrostatic latent image including an electric potential lower than that of the other portions is formed. The positively charged toner is supplied from the developing roller 37 to the surface of the photosensitive drum 33 which includes the electrostatic latent image formed thereon. Consequently, the electrostatic latent image is developed to be a developer image.

The transfer roller 35 is disposed opposite to the photosensitive drum 33 and a transfer bias is applied thereto by a bias applying unit (which is not shown). The transfer roller 35 interposes and delivers the recording paper P between the transfer roller 35 and the photosensitive drum 33 which includes the developer image formed thereon (a transfer position) in a state in which the transfer bias is applied to a surface thereof, and thus transfers the developer image onto the surface of the recording paper P.

The resist roller 43 is disposed opposite to the resist roller 27 and is driven and rotated with a rotation of the resist roller 27.

The fixing unit 60 includes a heating roller 61 and a pressing roller 63.

The heating roller 61 is formed of a metal and is of a cylindrical shape, and includes a heater formed by a halogen lamp. A power is supplied from a power supply (not shown) to the heater so that heating is carried out.

The pressing roller 63 is driven and rotated in close contact with the heating roller 61.

The pressing roller 63 together with the heating roller 61 interposes and delivers the recording paper P sent after the transfer of the developer image in the transfer position, thereby thermally fixing the developer image onto the recording paper P.

The paper discharging unit 70 includes a guide 71, a guide 72, a guide 73, a paper discharging roller 75 and a paper discharging tray 77.

The guide 71 is disposed on a side of the fixing unit 60 in a direction of an arrow B (which will be hereinafter referred to as a "B direction" and is opposite to the A direction), and the recording paper P delivered by the fixing unit 60 is guided toward the guide 72.

The guides 72 and 73 guide the recording paper P guided by the guide 71 toward the paper discharging roller 75.

The paper discharging roller 75 is constituted by a pair of rollers and discharges the recording paper P guided by the guides 72 and 73 in the A direction.

The paper discharging tray 77 is formed integrally with the housing 2 below the paper discharging roller 75, and the recording paper P discharged and dropped from the paper discharging roller 75 is stacked therein.

The scanner 8 includes a flat bed 81 and an automatic document feeder 100 (hereinafter referred to as an "ADF 100").

The flat bed 81 includes a document mounting table 82, an image sensor 83 as a reading unit, a reading control board 87, a document cover 84 and a panel 90.

The document mounting table 82 includes, in an upper part, a transparent document glass 85 on which the document G is to be mounted.

The image sensor 83 is disposed opposite to a lower surface of the document glass 85 on the inner part of the document mounting table 82 and reads an image on the surface of the document G delivered by the ADF 100 or an image on the surface of the document G mounted on the upper surface of the document glass 85.

The image sensor 83 is disposed opposite to an ADF reading region on the side in the B direction of the document glass 85 when reading an image on the surface of the document G delivered by the ADF 100, and is disposed opposite to an FB reading region on the side in the A direction of the document glass 85 when reading the image on the surface of the document G mounted on the upper surface of the document glass 85.

The document cover 84 is disposed above the document mounting table 82, and includes a rotating shaft 88 at an end on the side in the B direction, the shaft 88 being supported rotatably on the document mounting table 82. By such a structure, the document cover 84 is rotatable between a position in which the document G mounted on the document glass 85 is covered with the rotating shaft 88 to be a fulcrum and a position in which the upper surface of the document glass 85 is not covered by the document cover 84.

The panel 90 forms a wedge-like a sectional shape, and is disposed at an end of the document cover 84 on the side in the A direction (an end on a side in the direction of discharge of the document through the ADF).

An upward installation surface 90a of the panel 90 is provided with a liquid crystal display plate 91 to be a display portion for displaying an error message of the scanner 8 and the printer 1, and an operation keypad 92 to be an operating portion, as shown in FIG. 3. A user can input an instruction for selecting a copying mode, a scanning mode, and a document reading instruction of the scanner 8 by means of the operation keypad 92.

The reading control board 87 is provided in the document mounting table 82 as shown in FIG. 2 and controls the scanner 8. The reading control board 87 is connected to the operation keypad 92 through a connecting line 96 and is connected to the main control board 89 through a connecting line 97. Moreover, the reading control board 87 is connected through a connecting line 99 to an ADF driving unit 104 for driving the ADF 100, as shown in FIG. 3, and is connected through a connecting line (not shown) to a motor (not shown) for driving the image sensor 83.

The reading control board 87 drives the ADF 100 and the image sensor 83 upon receipt of a signal based on a document reading instruction from the operation keypad 92, and transmits the signal to the main control board 89. In addition, the reading control board 87 carries out a correction processing on image data read by the image sensor 83 and transmits the corrected image data to the main control board 89.

When a sensor (which is not shown) detects that the document G is mounted on a document tray 101 of the ADF 100, the reading control board 87 drives the ADF 100 to deliver the document G and causes the image sensor 83 to read an image of the document G. When it is detected that the document G is not mounted on the document tray 101, the reading control board 87 causes the image sensor 83 to read the image of the document G mounted on the document glass 85.

The ADF 100 is fixed integrally with the document cover 84, and includes the document tray 101, a pick-up roller 103, a separating roller 105, a delivery roller 107, a driven roller 109, a driven roller 111, a paper discharging roller 113, an upper plate 115 and the ADF driving unit 104.

The document tray 101 is disposed to be extended in the A direction in a vertically upward projection from the document cover 84 and is provided in such a manner that a plurality of documents G can be stacked thereon. Moreover, a separating plate 101a which comes into contact with the separating roller 105 is provided integrally with a side end in the B direction of the document tray 101.

The pick-up roller 103 is disposed in an upper part of the side end in the B direction of the document tray 101, and feeds the document G stacked on the document tray 101 toward the separating roller 105.

The separating roller 105 is disposed opposite to and above the separating plate 110a, and the documents G fed by the pick-up roller 103 are interposed between the separating roller 105 and the separating plate 101a and separated one by one to be fed toward the delivery roller 107.

The delivery roller 107 is disposed on the downstream side in the B direction of the separating roller 105, and the document G fed by the separating roller 105 is interposed between the driven rollers 109 and 111 and curved to take on a U-like shape, and at the same time, the document G fed toward the upper plate 115.

The upper plate 115 is disposed on the downstream side in the A direction of the delivery roller 107, and the document G fed by the delivery roller 107 is guided in such a manner that the surface of the document G is opposed to the image sensor 83 through the ADF reading region of the document glass 85.

The paper discharging roller 113 is disposed on the downstream side in the A direction of the upper plate 115, and the document G passing through the upper plate 115 is discharged to an upper surface 84a of the document cover 84 (in the A direction).

The ADF driving unit 104 is disposed in the vertically upward projection of the driving unit 6 of the printer 1 and includes a motor and a gear (which are not shown). Moreover, the ADF driving unit 104 is controlled by the reading control board 87 and drives the pick-up roller 103, the separating roller 105, the delivery roller 107 and the paper discharging roller 113.

Next, the panel 90 will be described in detail.

The panel 90 is provided over a whole width of the side end in the A direction of the document cover 84, as shown in FIGS. 1 and 3.

The panel 90 includes a regulating surface 90b in addition to the installation surface 90a.

The installation surface 90a is protruded from the upper surface 84a of the document cover 84, and furthermore, is rotated in the A direction and is gradually inclined downward in the A direction, as shown in FIGS. 1 and 2.

The regulating surface 90b is protruded from the upper surface 84a of the document cover 84 and regulates a position of a tip of the document G discharged by the ADF 100. Moreover, the regulating surface 90b is gradually inclined upward in the A direction, as shown in FIG. 2.

Next, further description will be given to the structure of the panel 90.

The panel 90 includes the regulating surface 90b for regulating the tip of the document G discharged by the ADF 100. Therefore, it is possible to prevent the discharged document G from covering the operation key 92 or the liquid crystal display plate 91. Thus, it is possible to reduce a possibility that operability or visibility of the panel 90 might be deteriorated.

The multifunction apparatus 1000 sets the direction of discharge of the document G through the ADF 100 and the direction of discharge of the recording paper P through the discharging unit 70 to be in the A direction. Therefore, it is possible to set the directions of a variety of components of the multifunction apparatus 1000 to be more or less identical. As a result, the ADF driving unit 104 can be disposed in the vertically upward projection of the driving unit 6, as shown in FIG. 3. Thus, it is possible to decrease a size in a horizontal direction of the multifunction apparatus 1000.

Moreover, both the direction of pulling out of the paper feeding cassette 11 from the printer 1 and the direction of pulling out of the process cartridge 30 from the printer 1 are set to be in the A direction, and the installation surface 90a of the panel 90 is rotated in the A direction. As a result, the user can easily remove the process cartridge 30 and the paper feeding cassette 11 from the printer 1 by pulling in the A direction, which is in an opposing state to the installation surface 90a of the panel 90. Therefore, convenience can be enhanced. Furthermore, the multifunction apparatus 1000 also includes such a structure that only the side in the A direction is opened. Consequently, space can be saved in the horizontal direction.

In addition, the document tray 101 is disposed in the vertically upward projection of the document cover 84. Therefore, it is possible to decrease the size of the multifunction apparatus 1000 in the horizontal direction.

Next, a second aspect of the invention will be described. The second aspect is different from the first aspect in that a panel 170 is provided to be rockable with respect to a document cover 182. Accordingly, the description of similar portions will be omitted.

Figure 4:
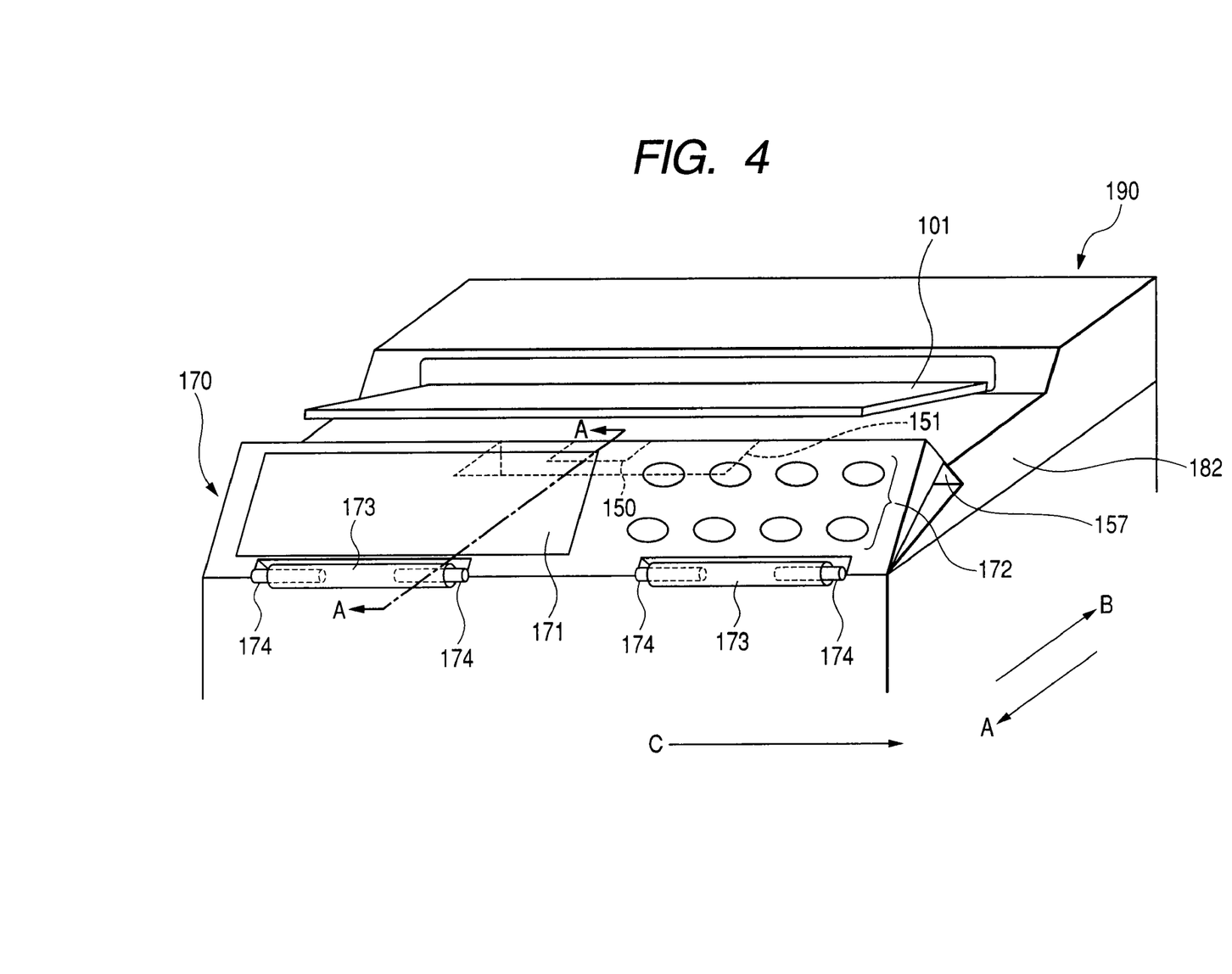
FIG. 4 is a perspective view showing a multifunction apparatus according to another aspect of the invention.

FIG. 4 is a perspective view showing a multifunction apparatus according to the second aspect.

Figure 5:
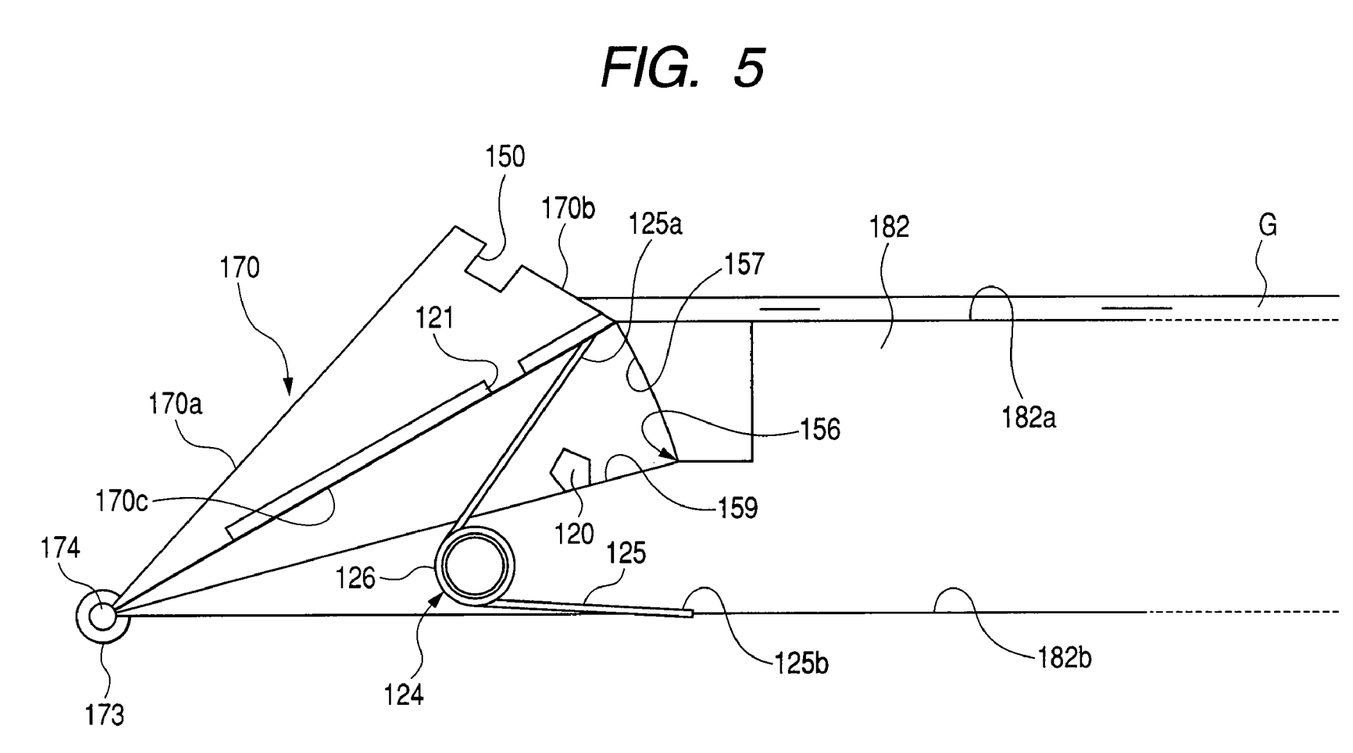
FIG. 5 is a sectional view taken along an A-A line in FIG. 4.

FIG. 5 is a sectional view taken along an A-A line in. FIG. 4.

The panel 170 includes an installation surface 170a, a regulating surface 170b, a bottom face 170c, a rotating shaft 174, an engagement hole 121 and a handle 150, as shown in FIGS. 4 and 5.

The installation surface 170a is disposed to be rotated in an A direction, and includes an operation keypad 172 and a liquid crystal display plate 171.

The regulating surface 170b is disposed to be rotated in a B direction.

The bottom face 170c is disposed to be rotated downward.

The engagement hole 121 is formed on the bottom face 170c, and is engaged with an engagement projection 120 provided on the document cover 182, thereby regulating a rocking motion of the panel 170.

The rotating shaft 174 is provided to be extended in a longitudinal direction (a C direction in the drawing) on a side end in the A direction of the panel 170. Moreover, the rotating shaft 174 is rotatably supported on a bearing 173 provided on the side end in the A direction of the document cover 182.

The handle 150 is formed to take a concave shape on a center portion in the C direction of the regulating surface 170b of the panel 170. The handle 150 is a concave portion formed to be a size such that a user can place a finger thereon.

The document cover 182 includes a panel housing portion 156, the bearing 173, the engagement projection 120 and a spring member 124.

The panel housing portion 156 is a concave portion for accommodating the panel 170, and includes a bottom face 159, an erected surface 157 and a notch portion 151.

The bottom face 159 is opposed to the bottom face 170c of the panel 170.

The erected surface 157 is erected upward from a side end in the B direction of the bottom plate 159. Moreover, the erected surface 157 is formed to take such a shape as to conform to a circular arc path of travel formed when a lower end of the regulating surface 170b is rotated around the rotating shaft 174.

The notch portion 151 is formed to be concaved in the B direction on a center in the C direction of the erected surface 157, that is, in an opposed position to the handle 150.

The bearing 173 is formed at a side end in the A direction of the panel housing portion 156 and rotatably supports the rotating shaft 174 of the panel 170.

The engagement projection 120 is formed to be protruded upward in a position of the bottom face 159 which corresponds to the engagement hole 121.

The spring member 124 is disposed in a lower part of the panel 170 in the document cover 182, and includes a core 126 and a torsion coil spring 125 wound therearound.

A lower end 125b of the torsion coil spring 125 is fixed to a bottom plate 182b of the document cover 182. Moreover, an upper end 125a of the torsion coil spring 125 penetrates through a hole of the bottom plate 159 (which is not shown), and furthermore, abuts on a side end in the B direction of the bottom face 170c of the panel 170. By such a structure, the side end in the B direction of the bottom plate 170c is energized upward.

When the regulating surface 170b is positioned above an upper surface 182a of the document cover 182 as shown in FIG. 5, the panel 170 is placed in that position by means of the spring member 124. Thus, a position in which the panel 170 is placed is set to be a regulating position.

Figure 6:
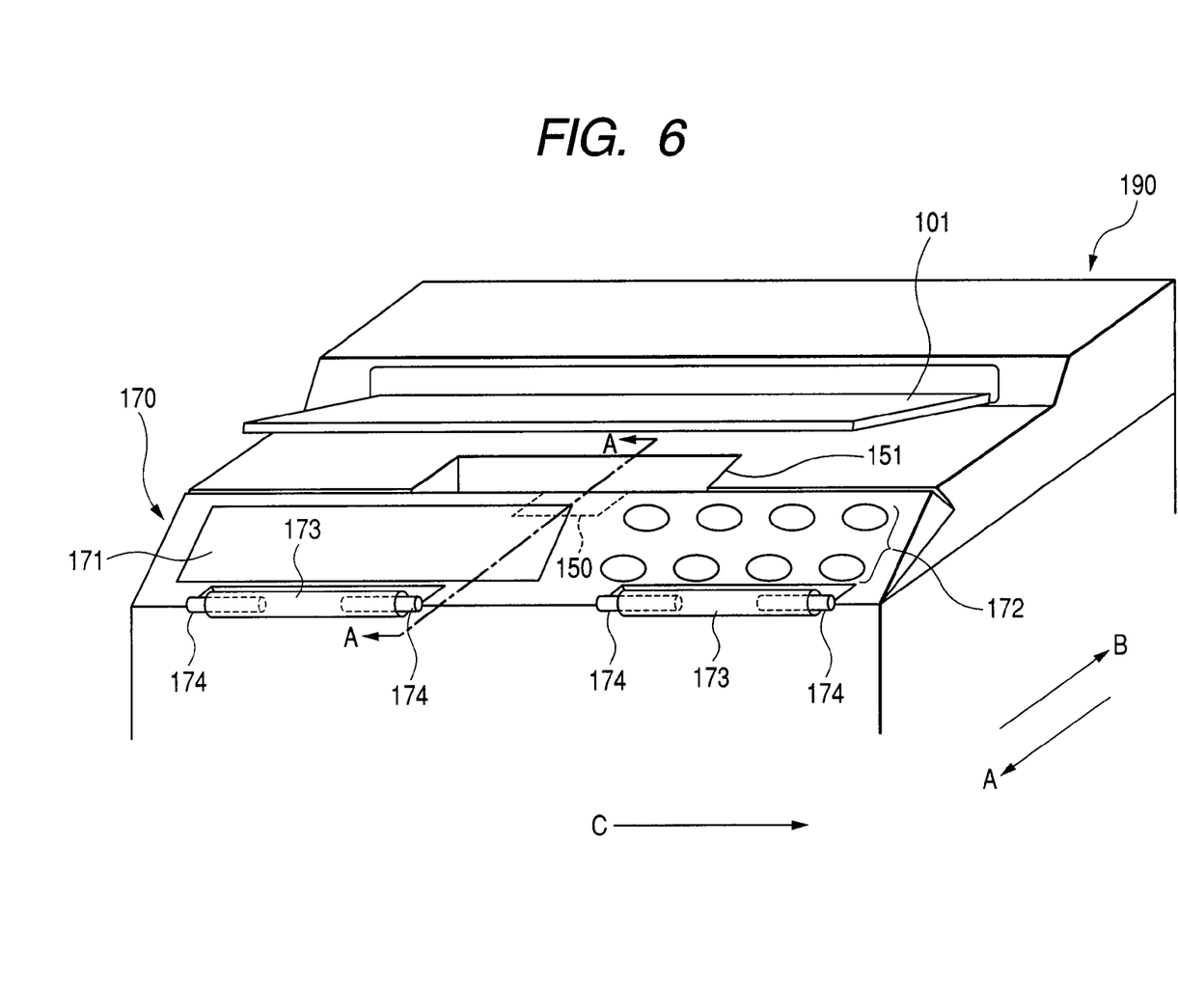
FIG. 6 is a perspective view showing the multifunction apparatus when a panel is placed in an accommodating position.
Figure 7:
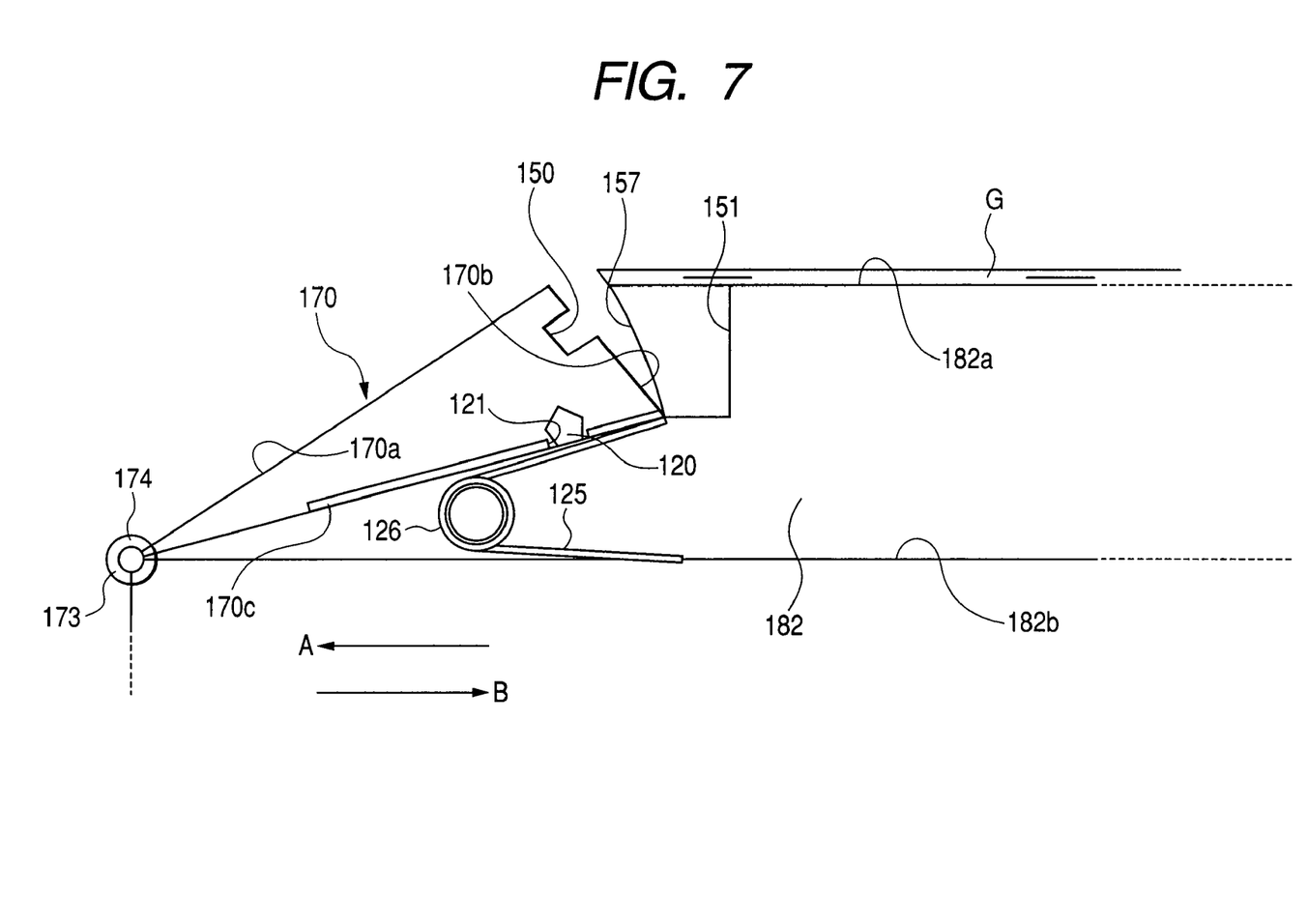
FIG. 7 is a sectional view taken along an A-A line in FIG. 6.

FIG. 6 is a perspective view showing a multifunction apparatus in which the panel 170 is placed in an accommodating position. FIG. 7 is a sectional view taken along an A-A line in FIG. 6.

With this structure, the side end in the B direction of the panel 170 can be rocked inward from the regulating position shown in FIG. 5 to subside below the upper surface 182a of the document cover 182, as shown in FIGS. 6 and 7. A position in which the panel 170 is disposed as shown in FIG. 6 is set to be an accommodating position.

The panel 170 is placed in the accommodating position by an engagement of the engagement hole 121 with the engagement projection 120.

By placing a finger on the handle 150 in the panel 170 through the notch portion 151 on the erected surface 157 of the document cover 182 and lifting the side end in the B direction of the panel 170, the user can disengage the engagement hole 121 from the engagement projection 120, thereby returning the panel 170 to the regulating position.

Next, further description will be given to the structure according to the second aspect.

When the panel 170 is placed in the regulating position, it is possible to regulate a movement in the A direction of a tip of a document G discharged from an ADF 100. When the panel 170 is rocked inward and placed in the accommodating position, the tip of the document G is exposed. Therefore, the user can easily remove the document G from the multifunction apparatus.

Moreover, the erected surface 157 is formed to take such a shape as to conform to the circular arc path of travel formed when the lower end of the regulating surface 170b is rotated. Consequently, the regulating surface 170b is smoothly rotated. Since a clearance is not generated between the erected surface 157 and the lower end of the regulating surface 170b in the regulating position, it is possible to reduce likelihood that the document G might be interposed and damaged therebetween.

Next, a third aspect of the invention will be described. The third aspect is different from the first aspect in that a notch for exposing a tip of a document G is formed on a panel 140, and the other portions are similar to those in the first aspect. Therefore, the description of the similar portions will be omitted.

Figure 8:
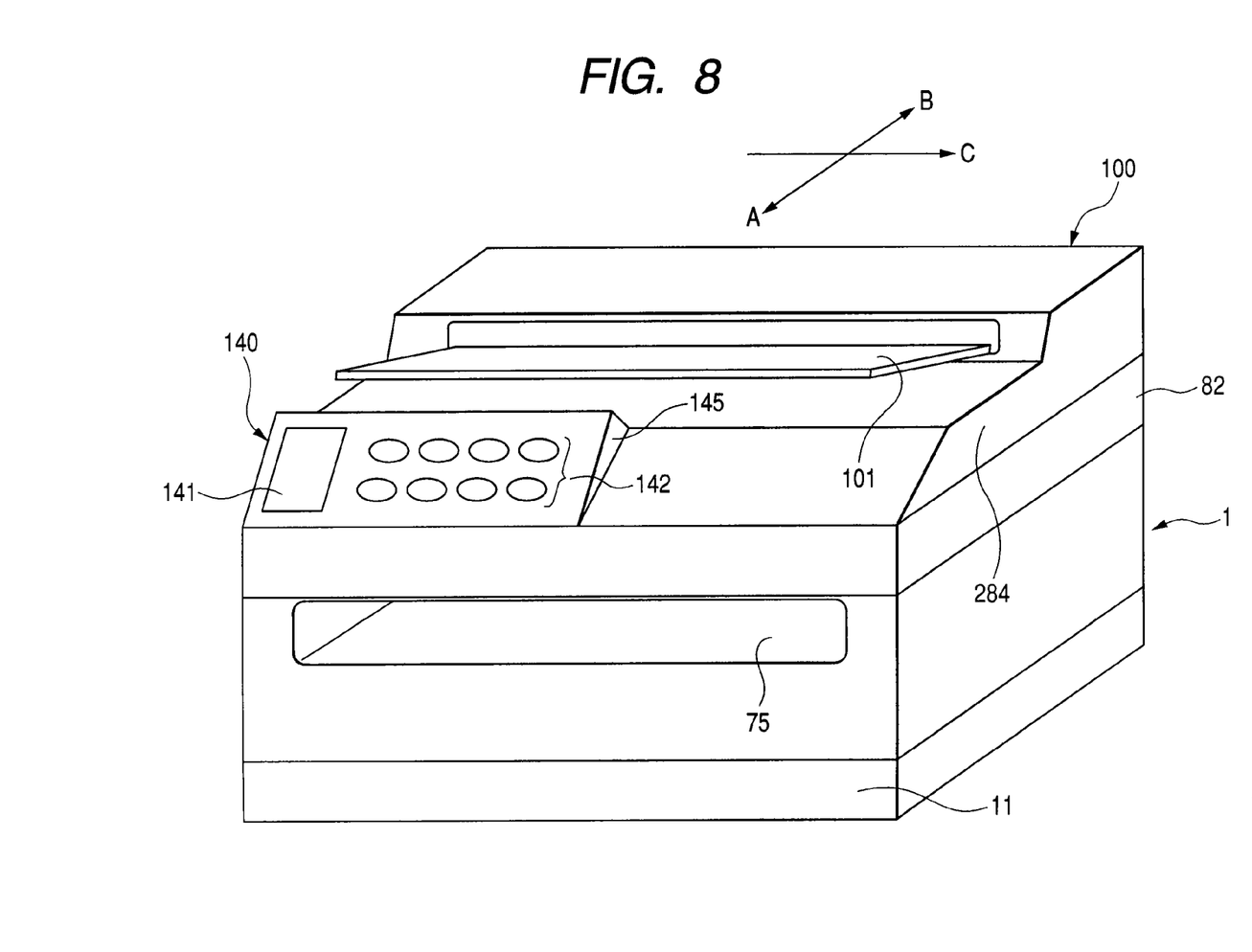
FIG. 8 is a perspective view showing a multifunction apparatus according to another aspect of the invention.

FIG. 8 is a perspective view showing a multifunction apparatus according to a fourth aspect of the invention.

As shown in FIG. 8, the panel 140 is provided with a notch portion 145 on a right side which is opposed to the panel 140. Thus, the tip of the document G discharged through an ADF 100 is exposed. Therefore, a user can easily collect the document G from a document cover 284.

The claims according to the invention are not restricted to the aspects of the invention as described above.

For example, while the regulating surface 90b is provided to regulate the position of the tip of the document G discharged through the ADF 100 in the first aspect, it may be provided to regulate a position of the side end of the document G.

According to the aspects, the panel includes the regulating surface for regulating the end of the document discharged by the automatic document feeder. Therefore, it is possible to prevent the discharged document from covering the operating portion or the display portion of the panel. Thus, it is possible to reduce a possibility that operability or visibility of the panel might be deteriorated.

According to the aspects, there is a higher probability that the tip portion in the direction of discharge of the document might cover the operating portion or the display portion of the panel as compared with the other end of the document. By regulating the tip, therefore, it is possible to more reliably reduce a probability that the operability or visibility of the panel might be deteriorated.

According to the aspects, the panel is displaced into the accommodating position which is accommodated in the document cover so that the end of the document regulated by the regulating surface is exposed. Consequently, a user can easily collect the document.

According to the aspects, the panel is provided with the notch portion in the opposed position to the end of the document which is discharged. Therefore, the end of the document is exposed by way of the notch portion. Thus, the user can easily collect the discharged document.

According to the aspects, the document tray is disposed in such a position as to overlap with a vertically upward projection of the document cover Therefore, a size of the image reading apparatus can be decreased, and furthermore, the panel can render easy removal of the document.

According to the aspects, the image reading apparatus according to the invention is applied to the multifunction apparatus. Therefore, it is possible to reduce a probability that the operability or visibility of the panel might be deteriorated in the multifunction apparatus.

According to the aspects, the automatic document feeder and a driving system for the discharging unit can be disposed in the same projection in a vertical direction. Therefore, it is possible to reduce a size of the multifunction apparatus.

What is claimed is:

1. An image reading apparatus comprising:
   a document mounting table on which at least one document is to be mounted;
   a document cover disposed above the document mounting table and provided to be displaceable between a position in which the document mounting table is covered and a position in which the document mounting table is not covered;
   an automatic document feeder including a document tray being disposed above the document cover and being configured to mount at least one document, the automatic document feeder delivering the document mounted on the document tray and discharging the document to an upper surface of the document cover;
   a reading unit that reads an image on a surface of the document mounted on the document mounting table or an image located on a surface of the document delivered by the automatic document feeder; and
   a panel disposed on the document cover, the panel including an arrangement surface provided with a display portion that displays predetermined information or with an operating portion which can be operated by a user, wherein
   the panel includes a regulating surface which is different from the arrangement surface, the regulating surface being protruded from the upper surface of the document cover and which regulates a position of an end of the document discharged through the automatic document feeder.

2. The image reading apparatus according to claim 1, wherein
   the panel is disposed in such a manner that the regulating surface is opposed to a tip of the document discharged from the automatic document feeder.

3. The image reading apparatus according to claim 1, wherein
   the panel is provided to be displaceable into a regulating position in which the end of the document discharged from the automatic document feeder can be regulated by the regulating surface protruded from the upper surface of the document cover and an accommodating position in which the panel is accommodated in the document cover.

4. The image reading apparatus according to claim 1, wherein
   the panel is provided with a notch portion at a position opposing the end of the document discharged through the automatic document feeder.

5. The image reading apparatus according to claim 3, wherein
   the document tray is disposed in such a position as to overlap with a vertically upward projection of the document cover.

6. A multifunction apparatus comprising:
   an image reading apparatus including:
      a document mounting table on which at least one document is to be mounted;
      a document cover disposed above the document mounting table and provided to be displaceable between a position in which the document mounting table is covered and a position in which the document mounting table is not covered;

an automatic document feeder including a document tray being disposed above the document cover and being configured to mount at least one document, the automatic document feeder delivering the document mounted on the document tray and discharging the document to an upper surface of the document cover;

a reading unit that reads an image on a surface of the document mounted on the document mounting table or an image located on a surface of the document delivered by the automatic document feeder; and a panel disposed on the document cover, the panel including an arrangement surface provided with a display portion that displays predetermined information or with an operating portion which can be operated by a user; and an image forming apparatus including an image forming portion that forms an image on a recording medium, wherein the panel includes a regulating surface which is different from the arrangement surface, the regulating surface being protruded from the upper surface of the document cover and which regulates a position of an end of the document discharged through the automatic document feeder.

7. The multifunction apparatus according to claim 6, wherein the image forming apparatus includes a discharging unit that discharges the recording medium including the image formed thereon in a same direction as a direction of discharge of a document by the automatic document feeder.

* * * * *